July 25, 1939. D. R. HILLIS Re. 21,160

REVERSIBLE LUBRICATING FEEDER SYSTEM

Original Filed March 16, 1931 6 Sheets-Sheet 1

INVENTOR.
DAVID R. HILLIS.
BY
ATTORNEY.

July 25, 1939. D. R. HILLIS Re. 21,160

REVERSIBLE LUBRICATING FEEDER SYSTEM

Original Filed March 16, 1931 6 Sheets-Sheet 2

INVENTOR.
DAVID R. HILLIS
BY Ralph S. Binns
ATTORNEY.

July 25, 1939. D. R. HILLIS Re. 21,160

REVERSIBLE LUBRICATING FEEDER SYSTEM

Original Filed March 16, 1931 6 Sheets-Sheet 3

INVENTOR.
DAVID R. HILLIS
BY Ralph S. Burns
ATTORNEY.

REVERSIBLE LUBRICATING FEEDER SYSTEM
Original Filed March 16, 1931 6 Sheets-Sheet 4
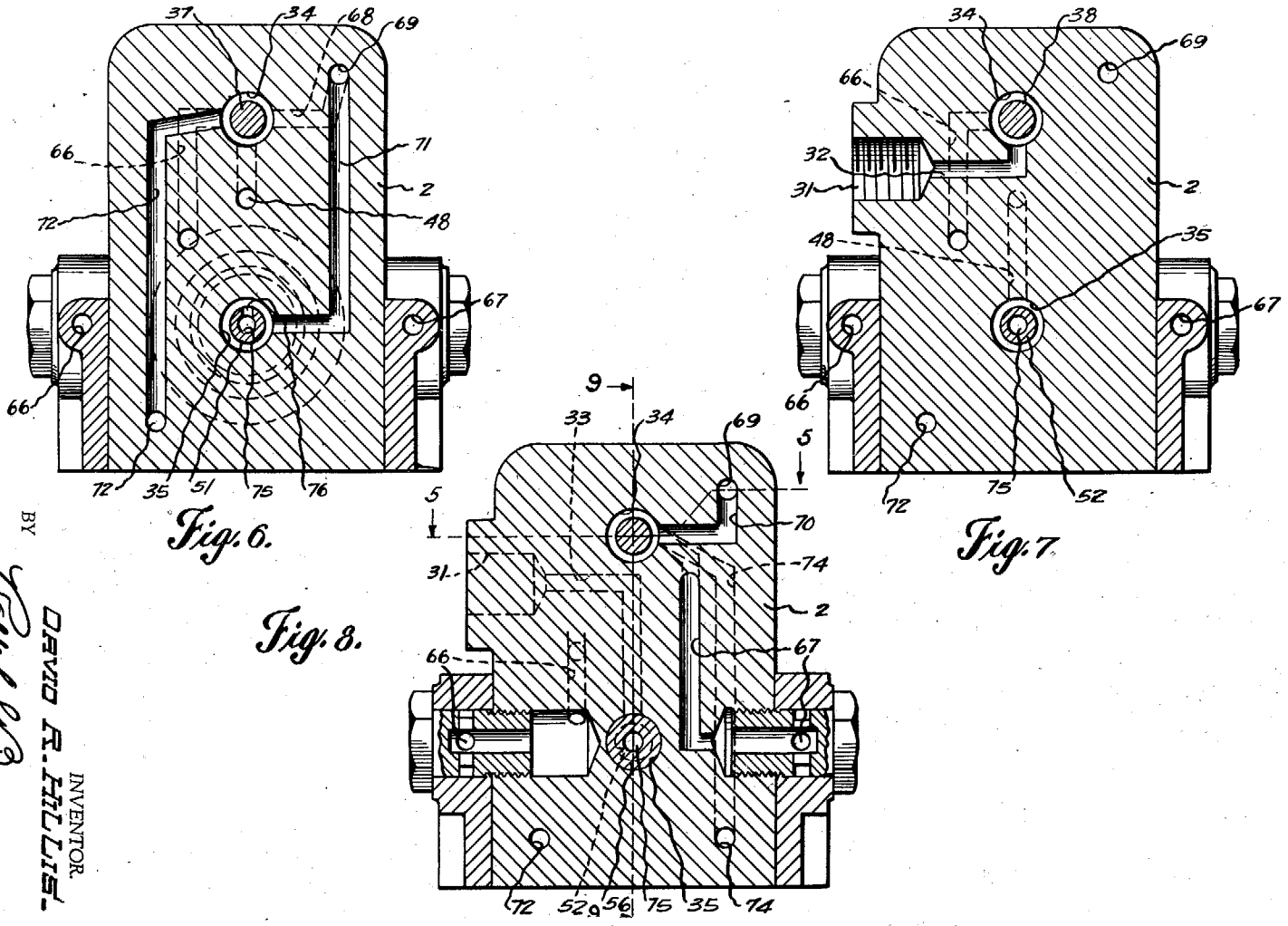
INVENTOR.
DAVID R. HILLIS.
BY Ralph S. Bruns.
ATTORNEY.

July 25, 1939. D. R. HILLIS Re. 21,160

REVERSIBLE LUBRICATING FEEDER SYSTEM

Original Filed March 16, 1931 6 Sheets-Sheet 5

INVENTOR.
DAVID R. HILLIS.

BY Ralph S. Sims
ATTORNEY.

REVERSIBLE LUBRICATING FEEDER SYSTEM

Original Filed March 16, 1931 6 Sheets-Sheet 6

INVENTOR.
DAVID R. HILLIS.
BY
Ralph L. Barnes
ATTORNEY.

Reissued July 25, 1939

Re. 21,160

UNITED STATES PATENT OFFICE 21,160

REVERSIBLE LUBRICATING FEEDER SYSTEM

David R. Hillis, Detroit, Mich., assignor, by mesne assignments, to Trabon Engineering Corporation, Cleveland, Ohio, a corporation of Ohio Original No. 2,094,271, dated September 28, 1937, Serial No. 523,149, March 16, 1931. Application for reissue July 5, 1938, Serial No. 217,590

71 Claims. (Cl. 184—7)

The present invention relates to lubricating systems, and more particularly to a reversible lubricating system.

The main object of the invention is the provision of a single-pipe circuit, flow-reversing, telltale lubricating system which will distribute fluids, gases, air or plastic material and particularly lubricant to a plurality of associated devices through a series of feeders or measuring devices connected thereto when the same is forced through the feeders in either direction of flow and which will indicate whether or not there is a leak in the circuit, or a clogged bearing or whether the circuit is obstructed or whether the system is working satisfactorily.

Other objects are to provide a system which is positive in its action, which will handle various kinds of fluids and which will deliver a measured quantity thereof to each bearing or associated device which is so simple in construction as to be practically fool-proof; and which is durable and operates in all seasons without any changes.

These and other objects will appear as the description progresses, reference being had to the accompanying drawings in which:

Fig. 6 is a transverse sectional view taken on line 6—6 of Fig. 4;

Fig. 7 is a transverse sectional view taken on line 7—7 of Fig. 4;

Fig. 8 is a transverse sectional view taken on line 8—8 of Fig. 4;

Reference will now be made to the drawings in which like reference characters designate like parts throughout.

Figure 1:
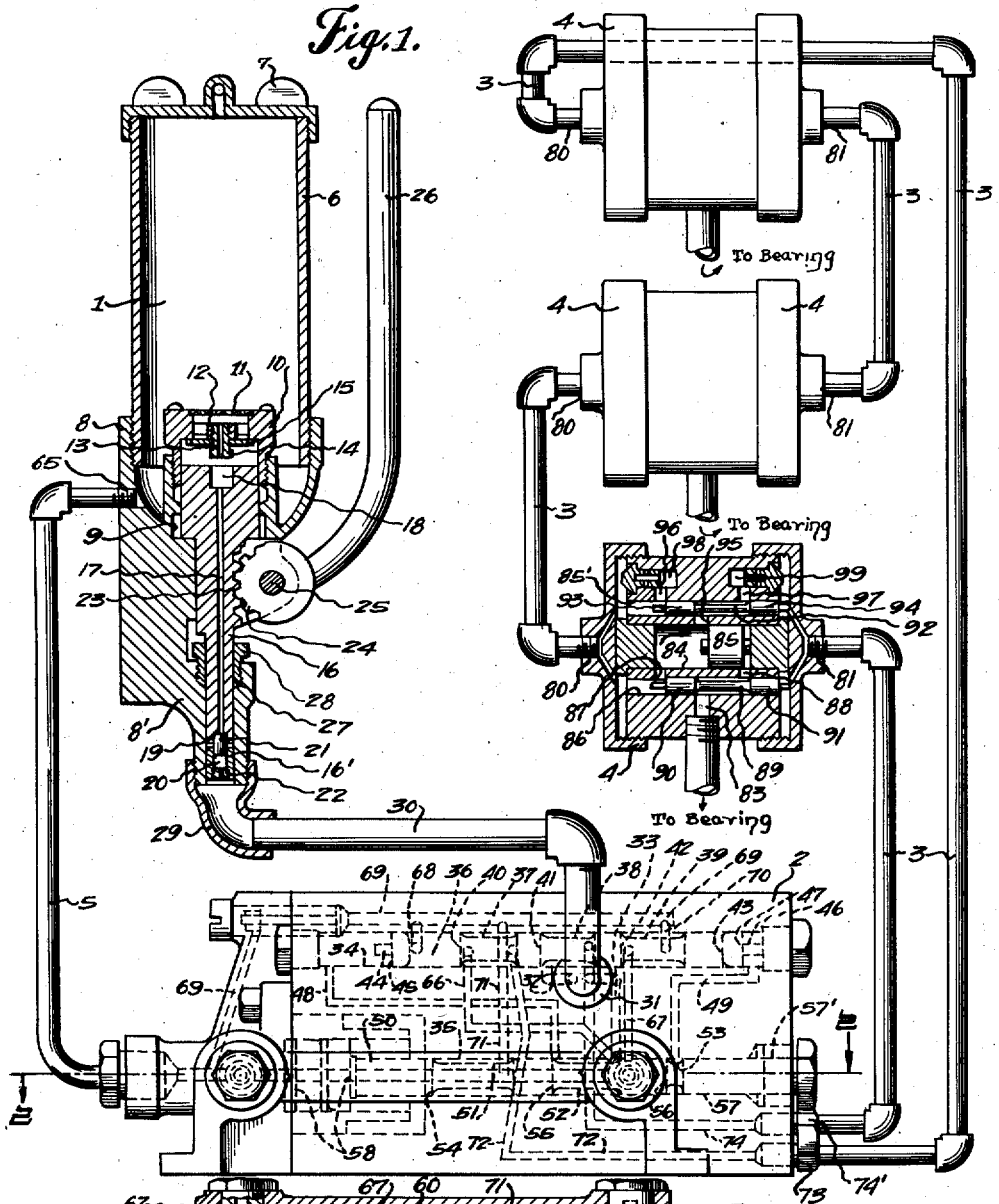
Figure 1 is a schematic general view of my new and improved lubricating system, showing some of the parts in section.

The numeral 1 represents a pump which is connected to and delivers lubricant under pressure to a lubricant flow-reversing and circuit-indicating device 2 which in turn is connected to both ends of a circuit pipe-line or conduit 3 which is equipped with a plurality of reversible feeders 4 provided with by-pass means as hereinafter described, and there is a return pipe 5 which returns lubricant from the flow-reversing and circuit-indicating device to the pump reservoir.

The pump 1 comprises a cylinder 6 having a cap 7 and a hollow head 8 having a circular bore 9 screwthreaded to receive a sleeve 10, the inner end of which is screened by a suitable screen 11 secured thereto in any suitable manner. The sleeve 10 has a spider 12 which may be integral therewith and which is also perforated and screwthreaded in the center to receive a hollow screw 13 having a head 14. A floating disk valve 15 slides on the screw 13 between the spider 12 and the head 14.

The hollow head 8 of the pump has an extending supporting portion 8′ receiving one end of the piston 16 the other end of the piston being received in the bore and sleeve. The piston 16 has a central passage 17 which is counterbored as at 18 which receives the head 14 of the screw 13.

Radial passages 19 are drilled in the piston and permit the lubricant to flow from the central passage 17 into an annular chamber in the nozzle portion 8′ of the hollow head 8 surrounding the reduced portion 16′ of the piston 16. The passage 17 is counterbored at the discharge end as at 20 to accommodate a floating valve 21 and is screwthreaded to receive a sleeve 22 acting as a seat for the valve.

The piston 16 is provided with a rack 23 which registers with and is operated by a segment 24 mounted on a shaft 25 supported on the hollow head 8 and the segment is turned on the shaft by a handle 26.

The portion 8′ of the hollow head 8 surrounding the piston is sealed by any suitable means such as the packing gland 27 and the nut 28.

I have shown the outlet end of the portion 8′ as screw threaded to fit any suitable piping connection such as 29 which is suitably connected to a conduit 30 conveying the fluid to the flow-reversing and circuit-indicating member 2 through a port 31 therein, although the pump may be fitted directly to the port 31.

The port 31 communicates with two passageways 32 and 33. The passage 32 leads to a valve chamber 34. The passage 33 leads to a valve chamber 35.

A piston valve 36 having depressed portions 37, 38 and 39 providing valves 40, 41, 42 and 43 is mounted to reciprocate in the valve chamber 34. The piston valve 36 is provided with an abutment member 44 and a cup leather piston 45 at one end and a similar abutment member 46 and similar leather piston 47 at the other end.

The end of the valve chamber 34 in which abutment 44 is mounted communicates with valve chamber 35 through a passage 48 and the opposite end of the valve chamber 34 communicates with the valve chamber 35 through a passage 49.

A piston valve 50 is mounted in the valve chamber 35 and is provided with depressed portions 51, 52 and 53 providing valves 54, 55, 56 and 57. The valve 57 is provided with an extension 57' which slides through a perforated nut and sealing gland so as to indicate the movement of the piston valve 50, as well as the movement of the double headed piston 58 which actuates it.

The piston 58 reciprocates in a cylinder 59 which has a passageway 60 connecting one end of the cylinder with a valve chamber 61 and a second passageway 62 connecting the other end of the cylinder with said valve chamber 61.

The valve chamber 61 has a dumb-bell piston type valve 61' adapted to reciprocate therein and communicates with an outlet passage 63 communicating with the return discharge port 64 to which the pipe or conduit 5 is connected and said pipe 5 is connected to the pump reservoir in any suitable manner as at 65.

One end of the valve chamber 61 communicates with the annular passage in valve chamber 34 surrounding reduced portion 37 of the piston valve 36, between valves 40 and 41, through a passage 66 and the other end of the valve chamber 61 communicates with the annular passage in valve chamber 34 surrounding reduced portion 39 of the piston valve 36, between valves 42 and 43, through a passage 67.

Figures 11, 12:
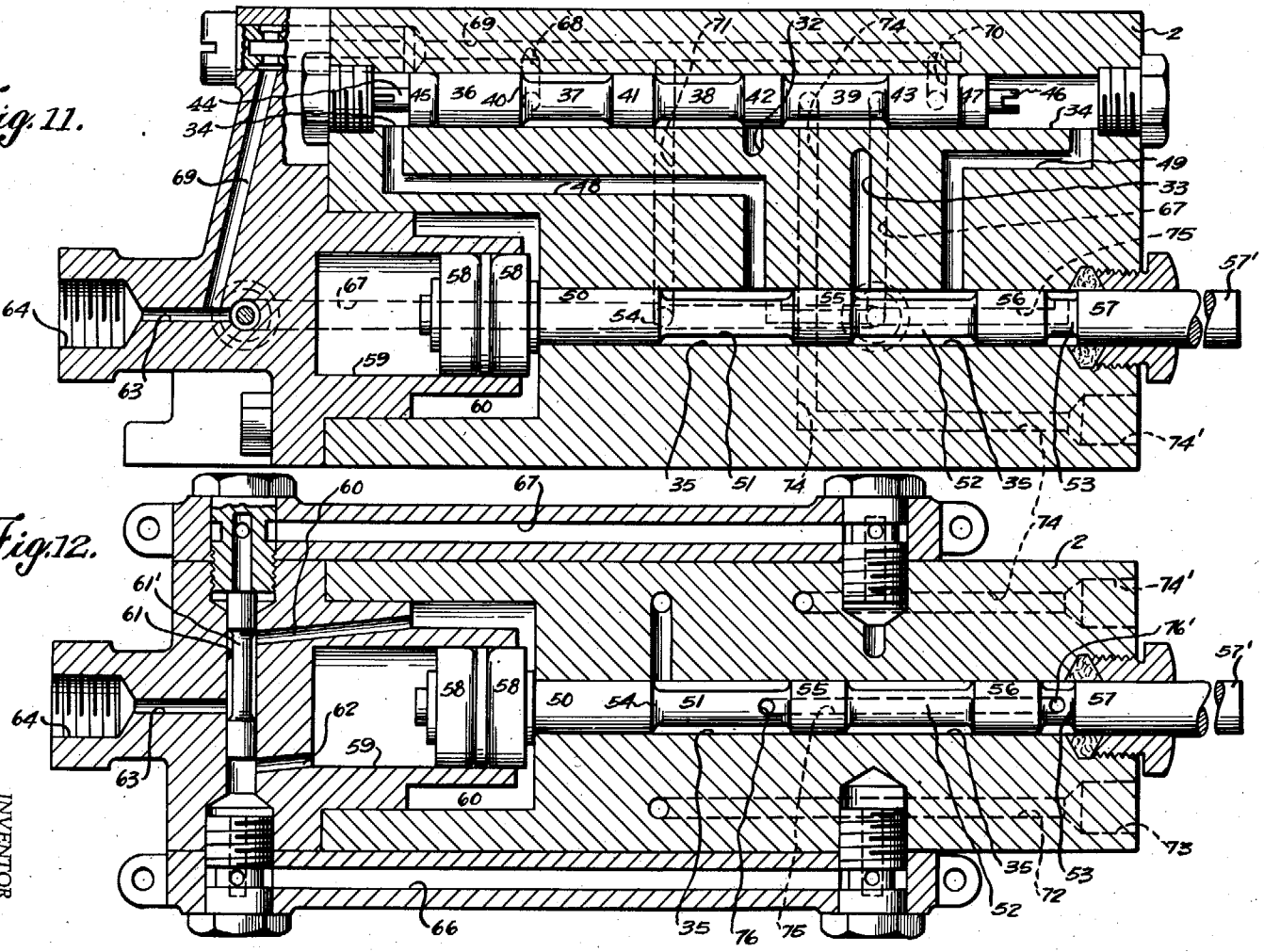
Fig. 11 is a sectional view taken on line 9—9 of Fig. 8 with the valves shown in a position opposite to that shown in Fig. 9.
Fig. 12 is a plan sectional view taken on line 10—10 of Fig. 9 with the piston valves shown in a position opposite to that shown in Fig. 10.

Leading from the valve chamber 34 in such manner as to be blocked by the valve 40, when in the position shown in Figs. 1, 4, 5 and 9 in the drawings, and so as to communicate with the annular passage surrounding the reduced portion 37 of the piston valve 36 when it shifts to the position shown in Fig. 11 thereof, is a duct 68 leading to a return passage 69 which opens into the outlet passage 63. A similar duct 70 communicates between the valve chamber 34 and the passage 69 in such manner that it registers with the annular passage surrounding reduced portion 39 of the piston valve 36 when in the position shown in Figs. 1, 4, 5 and 9 and when the piston shifts to the position shown in Fig. 11, the duct 70 is closed by the valve 43.

Another passage 71 connects the valve chamber 35 to the return passage 69 and said passage 71 always registers with the annular passage surrounding the reduced portion 51 of the piston valve 50 in the valve chamber 35 between valves 54 and 55.

A passage 72 connects the valve chamber 34 to one dual service port 73 which receives one end of the conduit 3 and said passage 72 is arranged in such manner that when the piston valve 36 is in the position shown in Figs. 1, 4, 5 and 9 it registers with the annular passage surrounding reduced portion 37 between valves 40 and 41 thus permitting communication with passage 66, and when the piston valve 36 is shifted to the position shown in Fig. 11, the passage 72 will then register with the annular passage surrounding reduced portion 38 between valves 41 and 42 thus receiving fluid entering said annular passage through passage 32.

Another passage 74 connects the valve chamber 34 to the other dual-service port 74' which receives the other end of the conduit 3. The passage 74 is so arranged that when the piston valve 36 is in the position shown in Figs. 1, 4, 5 and 9 it registers with the annular passage in the valve chamber 34 surrounding reduced portion 38 between valves 41 and 42 and so receives fluid entering said annular passage through the passage 32. When the piston valve 36 is shifted to the position shown in Fig. 11 the valve 42 prevents the passages 32 and 74 from communicating and the passage 74 then communicates with the passage 67 around the annular passage surrounding reduced portion 39 between valves 42 and 43.

A passageway 75 is drilled in the piston valve 50 connecting the annular passages surrounding reduced portions 51 and 53, the ports of said passageway 75 being designated 76 and 76' respectively.

When the piston valve 50 is in the position shown in Figs. 1, 2, 4, 9 and 10, the passageway 48 registers with the annular passage surrounding reduced portion 52 so that fluid entering said annular passage from passage 33 will pass into the passage 48 and shift the piston valve 36 in valve chamber 34 to the position shown in Figs. 1, 4, 5 and 9 and hold it there until the piston 58 again shifts when the passage 48 will register with the annular passage surrounding reduced portion 51 of the piston valve 50 as shown in Fig. 11 permitting lubricant to pass through passage 48 to passages 71, 69, 63 and through port 64 and pipe 5 back to the pump reservoir.

In like manner the passage 49 when piston 50 is in position shown in Figs. 1, 2, 4, 9 and 10, registers with the annular passage surrounding reduced portion 53 of the piston valve 50, thus permitting fluid to pass from the valve chamber 34 at the end in which leather piston 47 is mounted through passage 49 into the annular passage surrounding reduced portion 53 and through drilled passage 75 to the annlar passage surrounding reduced portion 51 and thence back to the reservoir as above described, and when piston 50 shifts to the position shown in Figs. 11 and 12, passage 49 registers with the annular passage surrounding reduced portion 52 between valves 55 and 56 thus permitting fluid entering said annular passage under pressure from passage 33 to flow into the valve chamber 34 at the side of cup leather 47 and abutment 46 causing valve 36 and all its parts to shift to the position shown in Fig. 11.

The pipe line or conduit 3 may have any number of feeders 4 of various sizes connected to any number of bearings or associated devices, and one feeder may be used for one or more such bearings or associated devices by arranging suitable branch pipes, or two feeders may be connected to one such bearing or associated device by merely providing a double valved connection.

Each feeder 4 is provided with two ports 80 and 81 connected to the pipe line or conduit 3 and a discharge port 83 connected to an associated device or to a bearing or to a pipe-line or suitable conduit leading to a bearing or receiving device.

Each feeder is provided with a cylinder 84 having a fluid pressure operated piston 85 adapted to reciprocate therein.

Each port 80 and 81 communicates with two cylindrical valve chambers 85' and 86 through suitable passages. The valve chamber 86 has a duct 87 communicating with one end of the cylinder 84 and a duct 88 communicating with the other end of said cylinder, and the discharge port 83 communicates with the central portion of the valve chamber 86. A dumb-bell piston type valve 89 having two heads 90 and 91 is mounted in said valve chamber 86 in such manner that the annular passage surrounding the reduced portion between said valve heads 90 and 91 always connects one of the ducts 87 or 88 with discharge port 83 when the valve is in either one of its shifted positions and at the same time opens the other duct 87 or 88 to the flow of fluid from the conduit.

The valve chamber 85' has a similar dumb-bell piston type valve 92 having heads 93 and 94. The cylinder 84 has a duct 95 communicating with the valve chamber 85' at approximately the central portion thereof. Said valve chamber 85' is also provided with a duct 96 and another duct 97 so arranged that the valve heads 93 and 94 will permit lubricant flowing out of the cylinder 84 to pass through one of these ducts to its respective by-pass valve chamber, of which there are two, designated 98 and 99, in each of which a slide valve of any ordinary type permitting fluid flow in one direction, is provided.

Figure 3:
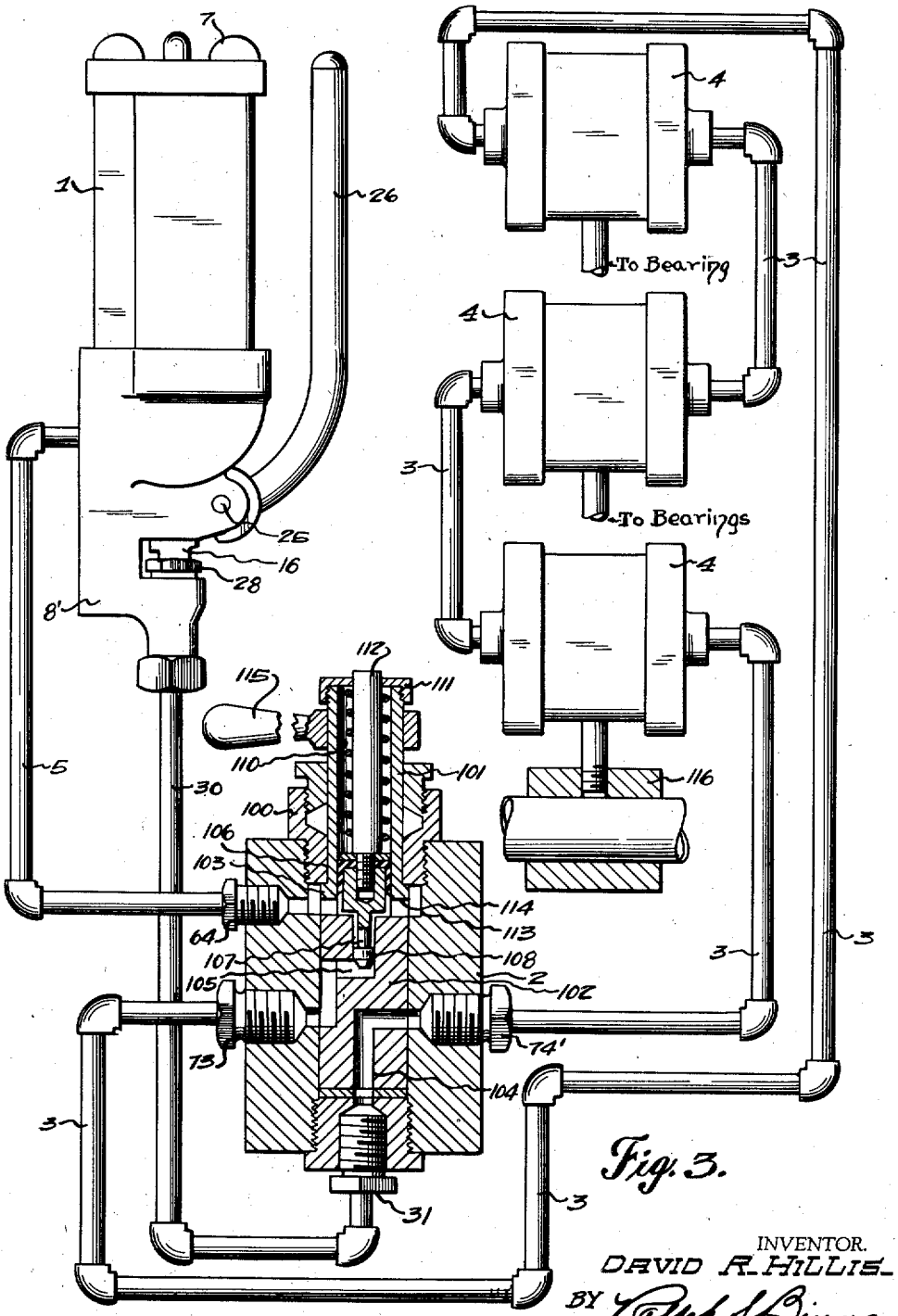
Figure 3 is a schematic view showing a modified form of distributor and indicator in section.

In the modification shown in Fig. 3, the flow-reversing and circuit-indicating member 2 comprises a block provided with an inlet port 31 and two dual service ports 73 and 74' and a return discharge port 64 connected in like manner as the automatic device heretofore described.

The block is cylindrically bored and the bore is screw-threaded at each end, one end receiving a hexed perforated screw plug which receives fluid from the pump, and serves as the inlet 31, and the other end receives a packing gland 100 through which the hollow extension 101 of a rotary valve plug 102 extends. The rotary valve 102 is mounted in the bore and the extension 101 is reduced thus providing a shoulder 103 against which the packing gland presses thereby holding the rotary valve plug in place.

The rotary valve plug is provided with a passage 104, one end of which is adapted to continuously register with the inlet port 31 and the other end of which is adapted to register with either port 73 or 74', depending on the position of the valve. The rotary valve plug also has another passage 105, one end of which continuously registers with the central chamber 110 in the hollow extension 101, and the other end is adapted to register with either one of the ports 73 or 74', always the one not registering at the same time with passage 104. Mounted in the central chamber 110, in the extension 101 so as to close it, is a spring pressed piston valve assembly 106 which is also adapted to normally close one end of the passage 105 and this valve has an extending stem 107 on which there is a second piston valve 108 which is adapted to extend into one end of the passage 105. The valve 108 has a tapered portion adapted to make entrance to passage 105 easy after it has been forced out thereof by the flow of fluid returning from the pipe-line circuit.

The extension 101 is closed by a perforated cap 111 through which a rod or other indicating member 112 slides and the cap also serves as an abutment for the spring which closes the valve.

The central passage 110 is always in communication with the return discharge port 64 by reason of the fact that the bore of the body member 2 is countersunk as at 113 thus providing an annular passage around the valve plug which communicates with said port 64 and radial passages 114 are drilled in the valve plug to communicate between the central passage 110 and the said annular passage in the bore.

The valve plug is manually operated by means of a handle 115 secured to the extension 101.

The numeral 116 represents a bearing or any other suitable receptacle, of which as heretofore described, there may be any number, and usually one branch pipe leads from each feeder to each bearing or receptacle.

Assuming that my system with the automatic flow-reverser as illustrated in Figs. 1 and 2 and 4 to 12 inclusive is filled with lubricant, the operation is as follows:

The operator oscillates the handle 26, thereby oscillating the segment 24 and reciprocating the piston 16 by means of the rack 23, so that as the handle 26 is raised to the position shown the piston 16 is lowered and as the handle is lowered the piston is raised. On each downward stroke of the piston lubricant is forced into the conduit 30 as the slide valve 21 then closes the axially drilled passages 19, and the space within the sleeve 10 between the disk 12 and the enlarged end of the piston and around the floating disk valve 15 is filled with lubricant by reason of suction and gravity and said lubricant is free of dirt and grit by reason of passing through the screen 11. On each upward stroke of the piston some of the lubricant trapped between the valve 15 and the enlarged head of the piston is forced out through the small passage in the screw 13 and back through the screen 11 into the reservoir of the pump thus cleansing the screen, and as the passage through the screw is smaller than the passage 17, the majority of said lubricant is forced through the passage 17, forcing the slide valve 21 to its seat on the sleeve 22 thereby opening the passage 17 to the radial passages 19 through which said lubricant passes to the annular passage around the reduced portion 16' of the piston 16 and below the moving parts of the piston.

As the lubricant is pumped through the conduit 30 it enters the automatic flow-reversing and circuit-indicating member 2 through the port 31 where part of it will pass through passage 33 into the annular chamber in valve chamber 35 surrounding reduced portion 52 of the piston valve 50 between valves 55 and 56 from whence it will pass into passage 48 and be conveyed into valve chamber 34 at the end adjacent abutment 44 of the piston valve 36 and acting on the leather piston 45, where such is used or on the piston valve itself, will force the same to the position shown in Figures 1, 4, 5 and 9 and hold it there while the lubricant entering passage 32 is transmitted throughout the circuit in one direction. In order that the valve 36 may move however, lubricant in the valve chamber 34 at the end in which abutment 46 is located, must be displaced, and this therefore is forced through passage 49 to the annular passage in valve chamber 35 surrounding the reduced portion 53 and thence through the drilled passage 75 in the valve stem leading to the annular pasasge surrounding reduced portion 51 from which it passes through passage 71 to the return discharge passage 69 thence through outlet passage 63 and port 64 through pipe 5 and back to the pump reservoir through port 65.

Figures 4, 5:
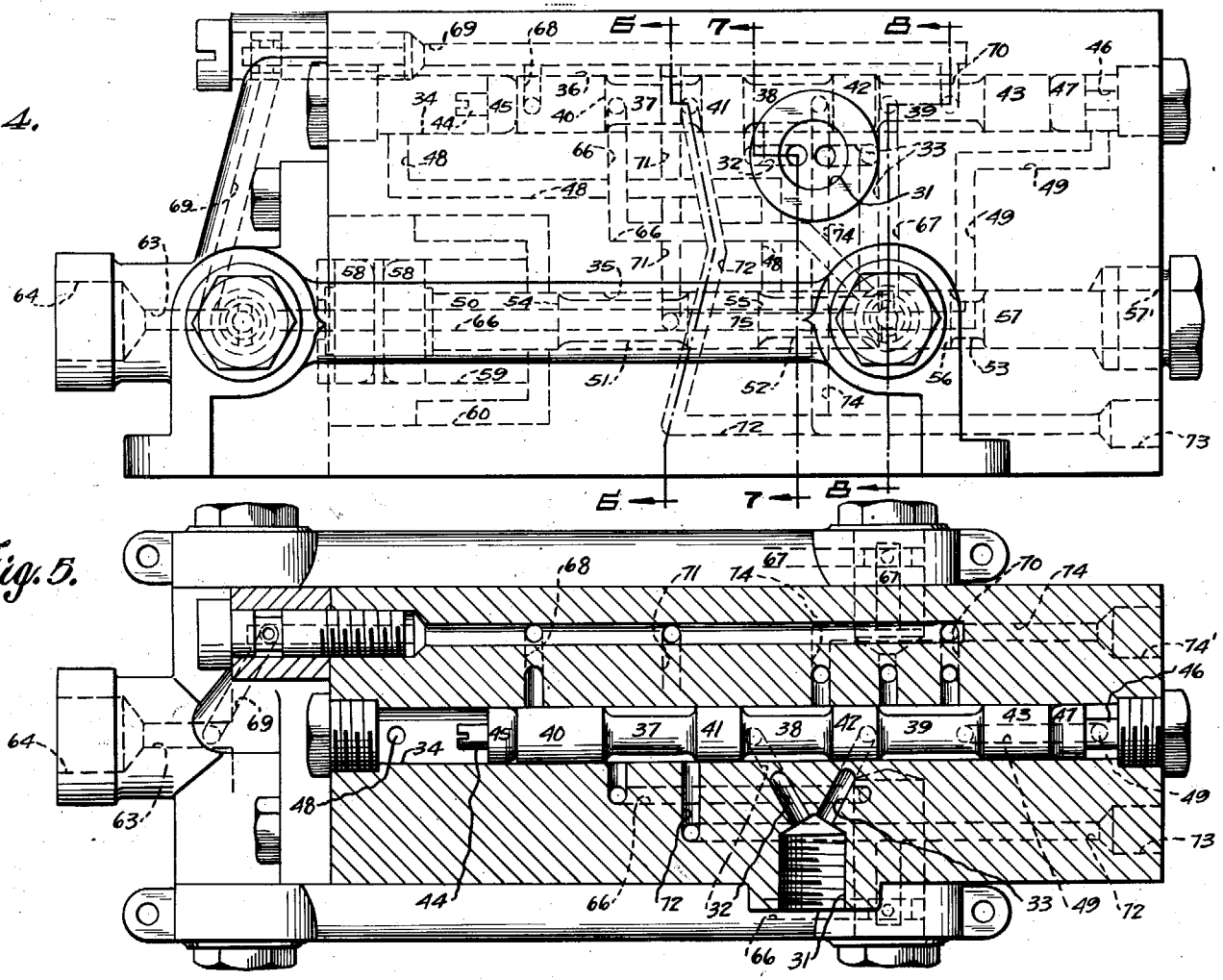
Fig. 4 is a side elevation of my automatically operated valve with ports and connection passages shown in dotted lines, being an enlargement of the valve as schematically shown in Fig. 1.
Fig. 5 is a plan sectional view of the entire automatic flow reversing valve taken on line 5—5 of Fig. 8.
Figures 9, 10:
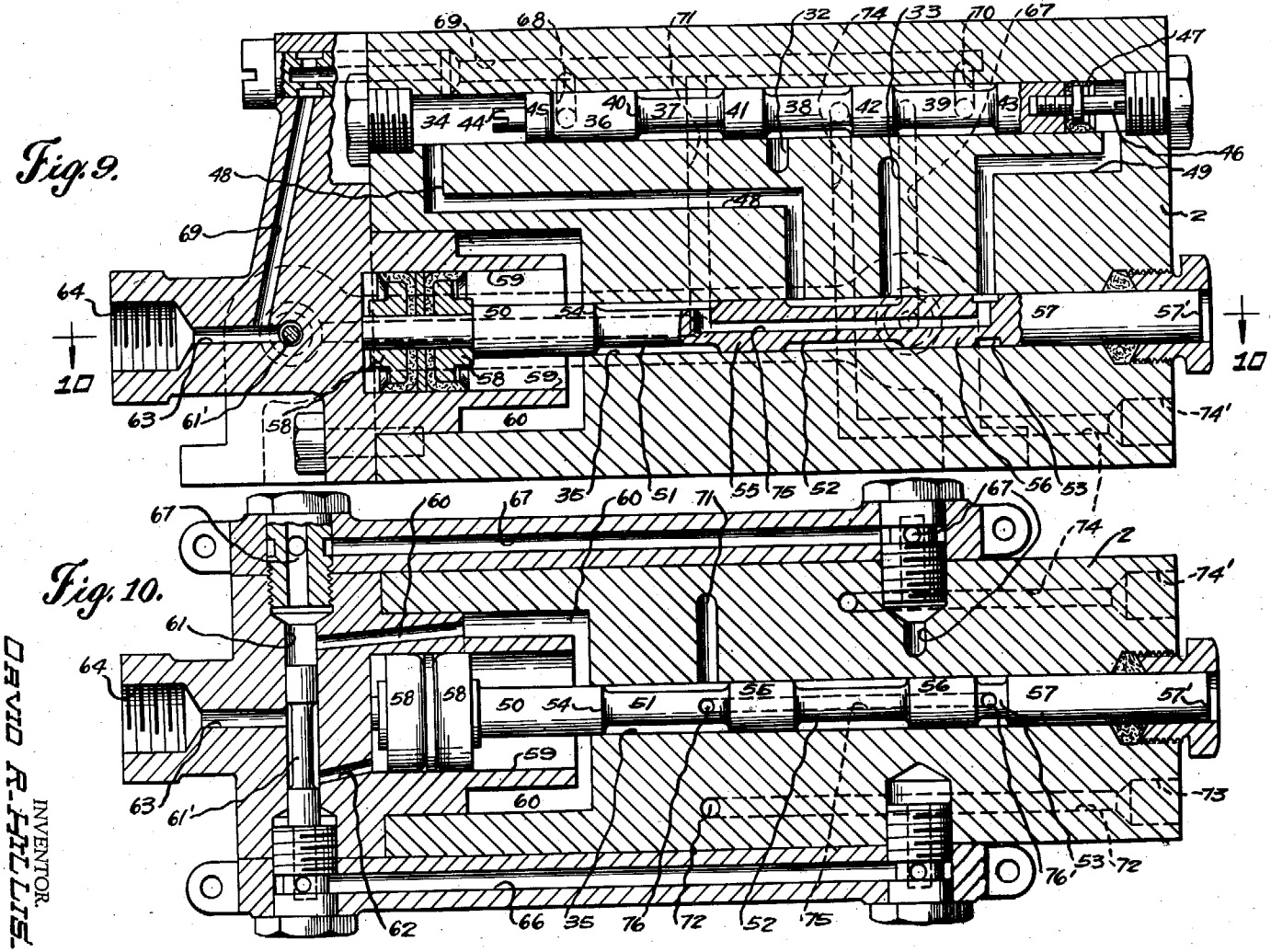
Fig. 9 is a central vertical sectional view of the entire automatic flow reversing valve taken on line 9—9 of Fig. 8.
Fig. 10 is a plan sectional view taken on line 10—10 of Fig. 9.

The lubricant entering passage 32 will now pass into the annular passage in the valve chamber 34 surrounding reduced portion 38 of the piston valve 36 between valves 41 and 42 from whence it will pass into passage 74 as best seen in Figs. 5 and 9 and thence through dual-service port 74' to one end of the pipe line or conduit 3 passing to the first progressive measuring feeder 4 and entering the same through port 81 at which time the ports will be in the position shown in the feeder illustrated in section in Fig. 1. The flow of the lubricant will then force both dumb-bell type piston valves 89 and 92 to slide to their opposite positions thus blocking the direct flow of lubricant from the port 81 through valve chamber 85' at the same time opening the duct 88 to the flow of lubricant from the port 81 through valve chamber 86, thus passing into the cylinder 84 and forcing the piston 85 to discharge lubricant on the other side through the duct 87 into the valve chamber 86 between valve heads 90 and 91 and thence through the discharge port 83 to the branch pipe leading to the bearing and thence to the bearing. After the piston has been forced from the position illustrated to its opposite position lubricant entering the feeder through port 81 may then pass through the cylinder and through duct 95 into the valve chamber 85' into the annular passage surrounding the reduced portion of the dumb-bell type piston valve 92 between valve heads 93 and 94 from whence it will pass through duct 96 to the valve chamber 98 and through the valved outlet thereof to the passage leading to port 80 through which it will pass to the conduit and then on to the next feeder, and so on through all feeders in the circuit and thence reenter the automatic flow-reverser and circuit-indicating member 2 through dual-service port 73 into and through passage 72 and into the annular passage in valve chamber 34 surrounding the reduced portion 37 of the piston valve 36 between valves 40 and 41 passing thereout through passage 66 into the valve chamber 61 where it encounters one head of the dumb-bell piston valve 61'. The flow moves this valve from the position shown in Figs. 2 and 10 to its opposite position shown in Fig. 12, which permits the lubricant to pass through passage 62 into the cylinder 59 forcing it to shift the piston 58 from the position shown in Figs. 1, 2, 4, 9 and 10 to its opposite position as shown in Figs. 11 and 12. Said shifting of the piston 58 shifts the piston valve 50 and all its parts and causes the indicator 57' to project a considerable distance through the packing gland which seals the valve chamber 35 to the valve 57 and extension 57'.

Figure 2:
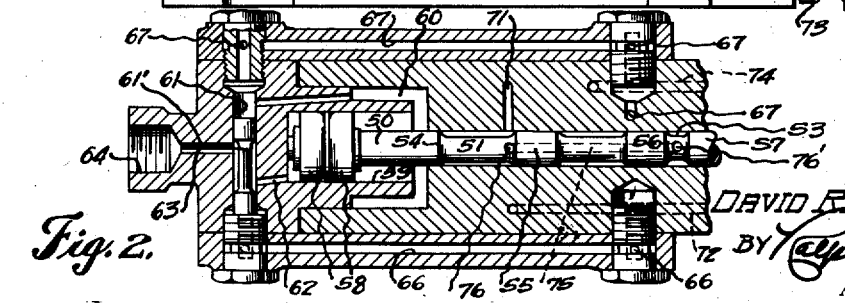
Figure 2 is a plan section view taken on the line 2—2 of Fig. 1.

In order that the valve 61' may shift from the position shown in Figs. 2 and 10, lubricant in the valve chamber 61 on the other side of the valve must be displaced, so it is free to pass through passage 67 and into the valve chamber 34 between valves 42 and 43 and thence through passages 70, 69, 63, port 64, pipe 5 and port 65 back to the reservoir.

Also in order that the piston 58 may shift from the position shown in Figs. 1, 2, 4, 9 and 10, the lubricant on the other side thereof passes out through passage 60 and into valve chamber 61 between the heads of the valve 61' and thence out through passage 63, port 64, pipe 5 and port 65 back to the reservoir.

When the piston 58 shifts the valve 50 from the position shown in Figs. 1, 2, 4, 9 and 10 to that shown in Figs. 11 and 12, this causes the passage 33 to communicate, through the annular passage in valve chamber 35 surrounding reduced portion 52 of piston valve 50, with passage 49, thus causing the valve 36 and all its parts to shift to the position shown in Figs. 11 and 12, and lubricant entering passage 32 will now be directed through valve chamber 34 and out through passage 72 and port 73 and so on in the reverse manner.

With the hand valve as illustrated in Fig. 3, the operator pumps until the indicator 112 moves up and down on each stroke of the pump and then he shifts the valve and pumps again until the indicator moves, and he then knows that each bearing connected to the circuit has been lubricated twice. If he neglects to shift the valve the indicator will continue to move and he will simply be pumping lubricant through the bypasses in the feeders and back into the reservoir.

When the lubricant returns through passage 105 it moves the valve 108 to rise out of said passage 105 and as the piston valve 106 seals the passage 110, the lubricant passes through passages 114, 113 to port 64 and thence through the pipe 5 back to the reservoir. The spring returns the valves 106 and 108 to their normal seats when pressure is relieved, and no pressure can be placed on the spring until each feeder in the circuit has satisfactorily discharged its measured quantity of lubricant to its associated bearing.

Many equivalent means will become apparent to those skilled in the art and I do not limit myself to the specific structures, numbers of feeders, bearings or parts shown, and I desire it to be understood that where the word lubricant is used in the claims, any other fluid such as water, gas and the like or any plastic material may be substituted and that any receptacle may be substituted for a bearing.

What I claim is:-

1. The combination of a plurality of bearings to be lubricated, a series of feeders, one adjacent each of said bearings, a pipe line connecting each of said feeders and adapted at each end to receive lubricant under pressure, each of said feeders supplying a measured quantity of lubricant to its associated bearing and uncovering a passage to the continuation of the pipe line when the lubricant is forced therethrough in either direction of flow.

2. In combination, a pump, a flow-reversing member connected thereto, a conduit leading from said member and returning thereto, and a lubricant discharging feeder connected to said conduit, said feeder having means for discharging a quantity of lubricant to a bearing when the lubricant is moved through the conduit in either direction of flow.

3. In combination, a pump, a flow-reversing and circuit-indicating member connected thereto, a conduit leading from said member and returning thereto and a lubricant discharging feeder connected to said conduit, said feeder having means for discharging a quantity of lubricant to a bearing when the lubricant is moved through the conduit in either direction of flow.

4. In combination, a pump, a lubricant fitting connected thereto for receiving lubricant under pressure and having two discharge and return ports and means for alternately directing the lubricant out of one of said ports and then out of the other, a conduit leading from one of the discharged and return ports of said fitting and returning to the other of said ports, a lubricant discharging feeder connected to said conduit, said feeder having means for discharging a quantity of lubricant to a bearing when the lubricant is moved through the conduit in either direction of flow, and means on the fitting for indicating when the means for alternately directing the lubricant out of one discharge port and then out of the other has been shifted.

5. The combination with a pump of a flow-reversing member, a conduit leading therefrom and returning thereto, and a lubricant-discharging feeder connected to said conduit provided with means for first discharging a quantity of lubricant to a bearing and for then uncovering a passage permitting lubricant under pressure to flow on through the conduit and back to the flow-reversing member.

6. The combination with a pump of a circuit-indicating and flow-reversing member, a conduit leading therefrom and returning thereto, and a lubricant-discharging feeder connected to said conduit provided with means for first discharging a quantity of lubricant to a bearing and for then uncovering a passage permitting lubricant under pressure to flow on through the conduit and back to the circuit-indicating and flow-reversing member.

7. The combination with a pump of a lubricant fitting connected thereto for receiving lubricant under pressure, a conduit leading from said fitting and returning thereto, a lubricant discharging feeder connected to said conduit provided with means for first discharging a quantity of lubricant to a bearing and for then uncovering a passage permitting lubricant under pressure to flow on through the conduit back to the lubricant fitting, and means in said fitting for reversing the flow through said conduit and means operated by said flow reversing means for indicating that the system is working satisfactorily.

8. In combination, a pump, a lubricant fitting connected thereto for receiving lubricant therefrom under pressure, said fitting having two discharge ports and also having means for reversing the discharge of lubricant therefrom, a conduit leading from one of the discharge ports of said fitting and returning to the other, a plurality of feeders connected to said conduit through which lubricant is discharged into bearings associated therewith, and bypass means in said feeders permitting flow of lubricant under pressure from said fitting and through said conduit and feeders and back to said fitting, and means for indicating whether or not the conduit is broken.

9. The combination of a plurality of bearings to be lubricated, a series of measuring devices one adjacent each of said bearings, a pipe line connecting said devices and extending from each end of the series, a lubricant fitting for receiving lubricant under pressure and connected to the extending extremities of the pipe line, each of said devices supplying a measured quanaity of lubricant to its associated bearing and uncovering a passage to the pipe line leading to the next device of the series and back to the lubricant fitting, and means for directing lubricant through said pipe line and measuring devices in either direction of flow.

10. The combination of a plurality of bearings to be lubricated, a series of measuring devices one adjacent each of said bearings, a pipe line connecting said devices and extending from each end of the series, a lubricant fitting for receiving lubricant under pressure and connected to the extending extremities of the pipe line, each of said devices supplying a measured quantity of lubricant to its associated bearing and uncovering a passage to the pipe line leading to the next device of the series and back to the lubricant fitting, means for indicating when the lubricant has made a complete circuit from the lubricant fitting and through the pipe line and measuring devices and back to the lubricant fitting, and means for directing lubricant through said pipe line and measuring devices in either direction of flow.

11. The combination with a pump, of a lubricant conduit extending therefrom and returning thereto and provided with a plurality of passageways adapted for connection to a plurality of bearings, means for reversing the flow through the conduit, means within the conduit for stopping the flow through the conduit when a bearing to which it leads is clogged, said means also supplying a quantity of lubricant to that bearing when it is not clogged and adapted to permit the lubricant to flow on through the conduit after such measured quantity has been supplied to said bearing.

12. The combination with a pump, of a lubricant conduit extending therefrom and returning thereto and provided with a plurality of passageways adapted for connection to a plurality of bearings, means for indicating when the lubricant has made a complete circuit through said conduit and for reversing the flow through the conduit, means within the conduit for stopping the flow through the conduit when a bearing to which it leads is clogged, said means also supplying a quantity of lubricant to that bearing when it is not clogged and adapted to permit the lubricant to flow on through the conduit after such measured quantity has been supplied to said bearing.

13. The combination with a pump, of a lubricant conduit extending therefrom and returning thereto and provided with a plurality of passageways adapted for connection to a plurality of bearings, automatic means for reversing the flow through the conduit, means within the conduit for stopping flow through the conduit when a bearing to which it leads is clogged, said means also supplying a quantity of lubricant to that bearing when it is not clogged and adapted to permit the lubricant to flow on through the conduit after such measured quantity has been supplied to the bearing.

14. The combination with a pump of a lubricant conduit extending therefrom and returning thereto and provided with a plurality of passageways adapted for connection to a plurality of bearings, automatic means for indicating when the lubricant has made a complete circuit through said conduit and for reversing the flow through the conduit, means within the conduit for stopping the flow through the conduit when a bearing to which it leads is clogged, said means also supplying a quantity of lubricant to that bearing when it is not clogged and adapted to permit the lubricant to flow on through the conduit after such measured quantity has been supplied to the bearing.

15. The combination with a pump, of a lubricant conduit extending therefrom and returning thereto and provided with a plurality of passageways adapted for connection to a plurality of bearings, means for indicating when the lubricant has made a complete circuit through said conduit and hand operated means for reversing the flow through the conduit, means within the conduit for stopping the flow through the conduit when a bearing to which it leads is clogged, said means also supplying a quantity of lubricant to that bearing when it is not clogged and adapted to permit the lubricant to flow on through the conduit after such measured quantity has been supplied to that bearing.

16. A lubricating system comprising a single-pipe circuit connected to a flow-reversing member receiving lubricant under pressure, feeders arranged in series in said single-pipe circuit and forming part thereof, bearings connected to said feeders, said feeders having means for discharging a measured quantity of lubricant as a result of each operation, and an indicator for showing when the lubricant has passed through the entire circuit.

17. A lubricating system for supplying lubricant to a plurality of bearings, comprising a reversible-flow single-pipe circuit and connected to said bearings by relatively short branch pipes and receiving from said single-pipe circuit lubricant flowing under pressure first in one and then in the opposite direction, a flow-reversing member connected to the ends of said single-pipe circuit for receiving lubricant under pressure for distribution through the single-pipe circuit to the respective feeders and thence to bearings, said feeders embodying means whereby discharge of a measured quantity of lubricant to the connected bearings is insured upon each reversal of flow of the lubricant, a tell-tale indicator mounted on said flow-reversing member that shows whether or not all connected bearings have been lubricated, said flow-reversing member functioning normally in changing direction of flow when the last feeder of the piping circuit has been served.

18. The combination of a plurality of bearings to be lubricated and a single-pipe flow-reversing lubricating system comprising a single-pipe main lubricant-distributing circuit, means for supplying lubricant thereto under pressure, means for reversing the direction of flow of lubricant in said circuit, lubricant feeders arranged in series in said main circuit and forming part thereof, branch pipes connecting said feeders to the bearings to be lubricated, means within the feeders to insure discharge therefrom to the bearings connected therewith of a measured quantity of lubricant upon each reversal of the direction of flow of lubricant within said main circuit, the alternating flow and return ends of which are connected to a flow-reversing member containing means for indicating obstruction to flow of lubricant to any one of the bearings.

19. The combination of a plurality of bearings to be lubricated, a plurality of feeders arranged in series one adjacent each of said bearings, a conduit connected to each of said feeders at each end thereof, each of said feeders having an outlet passage communicating with its respective bearing and having a plurality of ports connected to said conduit for delivering lubricant thereto and therefrom under pressure, and having pressure operated means for delivering to a bearing a predetermined quantity of lubricant entering each feeder through any of the said plurality of ports, and having means for directing lubricant under pressure to flow through said device to another of said plurality of ports after forcing lubricant into the bearing to which it is connected, each of said feeders being adapted to function when the lubricant is forced therethrough from either direction of flow in the conduit, and means in each end of the conduit for receiving lubricant under pressure.

20. Apparatus of the class described comprising a body having an inlet port for receiving lubricant under pressure and a pair of dual-service ports for discharging lubricant to and for receiving lubricant from a lubricant circuit and means for alternately directing lubricant from said body to the circuit first in one direction of flow and then in the other direction of flow.

21. Apparatus of the class described comprising a body having an inlet port for receiving lubricant under pressure and a pair of dual-service ports for discharging lubricant to and for receiving lubricant from a lubricant circuit, means for alternately directing lubricant from said body to the circuit first in one direction of flow and then in the other direction of flow, and means for indicating when lubricant has been received from the circuit.

22. Apparatus of the class described comprising a body having an inlet port for receiving lubricant under pressure and a pair of dual-service ports for discharging lubricant to and for receiving lubricant from a lubricant circuit, means for alternately directing lubricant from said body to the circuit in one direction of flow and then in the other, and an indicator operated by the pressure of the returning lubricant for showing when lubricant discharged to the circuit has made a complete circuit therethrough.

23. A flow-reversing valve comprising a body member having an inlet port, two dual-service ports, a return discharge port and a cylindrical bore, a valve member mounted in said bore, a passage in said valve member adapted to connect the inlet port with either one of said dual service ports, a second passage in said valve member adapted to connect the return discharge port with either of the dual service ports, said passages being so arranged that when one dual-service port is connected with the inlet port the other is connected to the return discharge port and manually operable means for shifting said valve.

24. A flow-reversing device comprising a body member having an inlet port, a pair of dual-service ports adapted for connection to the ends of a circuit and a return discharge port, valve means adapted to be alternated to connect the inlet port first to one and then to the other of the dual-service ports while simultaneously connecting the return discharge port first with one and then with the other of the dual-service ports whereby, when the inlet port is connected to one dual-service port, the return discharge port is connected to the other dual service port.

25. A flow-reversing device comprising a body member having an inlet port, a pair of dual-service ports adapted for connection to the ends of a circuit, a return discharge port, valve means adapted to be alternated to connect the inlet port first to one and then to the other of the dual-service ports while simultaneously connecting the return discharge port first with one and then with the other of the dual-service ports whereby, when the inlet port is connected to one dual-service port, the return discharge port is connected to the other dual service port and an indicating member operable by the return pressure of the fluid for indicating when fluid is returning through the device.

26. In combination, a lubricant reservoir, a pump connected thereto adapted to pump lubricant therefrom, a flow-reversing member connected to said pump, a conduit leading from said member and returning thereto, a lubricant discharging feeder connected to said conduit, said feeder having means for discharging a quantity of lubricant to a bearing when the lubricant is moved through the conduit in either direction of flow, said flow-reversing member being adapted to discharge the returning lubricant into said reservoir.

27. In combination, a lubricant reservoir, a pump connected thereto and adapted to pump lubricant therefrom, a flow-reversing member connected to said pump and having another connection direct to said reservoir, a conduit leading from said member and returning thereto, a lubricant discharging feeder connected to said conduit, said feeder having means for discharging a quantity of lubricant to a bearing when the lubricant is moved through the conduit in either direction of flow, said flow-reversing member being adapted to discharge the returning lubricant into said reservoir.

28. In combination, a pump, an automatically operated flow-reversing member connected thereto and receiving lubricant therefrom, a conduit leading from said member and returning thereto, and a lubricant discharging feeder connected to said conduit, said feeder having means for discharging a quantity of lubricant to a bearing when the lubricant is moved through the conduit in either direction of flow.

29. In combination, a pump, a flow-reversing member connected thereto comprising a body having an inlet and a pair of dual service ports and an exhaust, a primary valve means adapted to alternately connect the inlet with the respective dual service ports, secondary valve means adapted to control said primary valve means by directing pressure thereto from said inlet and connecting means between said dual service ports and the secondary valve means, whereby the latter is rendered operable, a conduit leading from one of the dual service ports of said flow-reversing member and returning to the other, and a lubricant discharging feeder connected to said conduit, said feeder having means for discharging a quantity of lubricant to a bearing when the lubricant is moved through the conduit in either direction of flow.

30. In combination, a pump, an automatically operated flow-reversing and circuit-indicating member connected thereto and receiving lubricant therefrom, a conduit leading from said member and returning thereto, and a lubricant discharging feeder connected to said conduit, said feeder having means for discharging a quantity of lubricant to a bearing when the lubricant is moved through the conduit in either direction of flow.

31. In combination, a pump, a flow-reversing and circuit-indicating member connected thereto and receiving lubricant therefrom, said member having a movable part controlled by the return flow of lubricant therethrough, a conduit leading from said member and returning thereto, and a lubricant discharging feeder connected to said conduit, said feeder having means for discharging a quantity of lubricant to a bearing when the lubricant is moved through the conduit in either direction of flow.

32. In combination, a pump, a lubricant fitting connected thereto having an inlet port for receiving lubricant under pressure and having two discharge and return ports and having automatically operated means controlled by the return flow of lubricant under pressure for alternately directing the lubricant out of one of said ports and then out of the other, a conduit leading from one of the discharge and return ports of said fitting and returning to the other of said ports, a lubricant discharging feeder connected to said conduit, said feeder having means for discharging a quantity of lubricant to a bearing when the lubricant is moved through the conduit in either direction of flow, and means on the fitting for indicating when the means for alternately directing the lubricant out of one discharge and return port and then out of the other has been shifted.

33. In combination, a pump, a lubricant fitting connected thereto for receiving lubricant under pressure and having two discharge and return ports and having an automatically operated flow-reversing member controlled by the return flow of lubricant under pressure for alternately directing the lubricant out of one of said ports and then out of the other, a conduit leading from one of the discharge and return ports of said fitting and returning to the other of said ports, a lubricant discharging feeder connected to said conduit, said feeder having means for discharging a quantity of lubricant to a bearing when the lubricant is moved through the conduit in either direction of flow, and means on the fitting for indicating when the means for alternately directing the lubricant out of one discharge and return port and then out of the other has been shifted.

34. In combination, a pump, a lubricant fitting connected thereto for receiving lubricant under pressure and having two discharge and return ports and means for alternately directing the lubricant out of one of said ports and then out of the other, a conduit leading from one of the discharge and return ports of said fitting and returning to the other of said ports, a lubricant discharging feeder connected to said conduit, said feeder having means for discharging a quantity of lubricant to a bearing when the lubricant is moved through the conduit in either direction of flow, and means on the fitting controlled by the pressure of lubricant returning thereto for indicating when the means for alternately directing the lubricant out of one discharge port and then out of the other has been shifted, said means including a moveable member controlled by flow of lubricant through said fitting.

35. The combination with a pump of an automatically operated flow-reversing member connected thereto and receiving lubricant therefrom, a conduit leading from said member and returning thereto, and a lubricant-discharging feeder connected to said conduit provided with means for first discharging a quantity of lubricant to a bearing and for then uncovering a passage permitting lubricant under pressure to flow on through the conduit and back to the flow-reversing member.

36. The combination with a pump of an automatically operated circuit-indicating and flow-reversing member connected thereto and receiving lubricant therefrom, a conduit leading from said member and returning thereto, and a lubricant-discharging feeder connected to said conduit provided with means for first discharging a quantity of lubricant to a bearing and for then uncovering a passage permitting lubricant under pressure to flow on through the conduit and back to the circuit-indicating and flow-reversing member.

37. The combination with a pump of a circuit-indicating and flow-reversing member connected thereto and receiving lubricant therefrom, said member including a moveable part controlled by flow of lubricant therethrough, a conduit leading from said member and returning thereto, and a lubricant-discharging feeder connected to said conduit provided with means for first discharging a quantity of lubricant to a bearing and for then uncovering a passage permitting lubricant under pressure to flow on through the conduit and back to the circuit-indicating and flow-reversing member.

38. The combination with a pump of a lubricant fitting connected thereto for receiving lubricant under pressure, a conduit leading from said fitting and returning thereto, a lubricant discharging feeder connected to said conduit provided with means for first discharging a quantity of lubricant to a bearing and for then uncovering a passage permitting lubricant under pressure to flow on through the conduit back to the lubricant fitting, means in said fitting for reversing the flow through said conduit and means comprising a moveable members operated by said flow-reversing means, for indicating that the system is working satisfactorily.

39. The combination with a pump of a lubricant fitting connected thereto for receiving lubricant under pressure, a conduit leading from said fitting and returning thereto, a lubricant discharging feeder connected to said conduit provided with means for first discharging a quantity of lubricant to a bearing and for then uncovering a passage permitting lubricant under pressure to flow on through the conduit back to the lubricant fitting, and means in said fitting for reversing the flow through said conduit, said flow-reversing means including a moveable member that is automatically moved on each completion of flow of lubricant through said pipe-line from said fitting and back thereto and moveable indicating means operated by the movable member of said flow-reversing means for indicating that the system is working satisfactorily.

40. In combination, a pump, a lubricant fitting connected thereto for receiving lubricant therefrom under pressure, said fitting having two discharge ports and also having adjustable means for alternately reversing the discharge of lubricant therefrom, a conduit leading from one of the discharge ports of said fitting and returning to the other, a plurality of feeders connected to said conduit through which lubricant is discharged into bearings associated therewith, and by-pass means in said feeders permitting flow of lubricant from said fitting and through said conduit and feeders and back to said fitting in either direction of flow, and means including a member moveable by pressure of the return flow of lubricant for indicating whether or not the conduit is broken.

41. In combination, a pump, a lubricant fitting connected thereto for receiving lubricant therefrom under pressure, said fitting having two discharge ports and also having automatically operated means for alternately reversing the discharge of lubricant therefrom, a conduit leading from one of the discharge ports of said fitting and returning to the other, a plurality of feeders connected to said conduit through which lubricant is discharged into bearings associated therewith, and by-pass means in said feeders permitting flow of lubricant under pressure from said fitting and through said conduit and feeders and back to said fitting in either direction of flow, and means for indicating whether or not the conduit is broken.

42. In combination, a pump, a lubricant fitting connected thereto for receiving lubricant therefrom under pressure, said fitting having two discharge ports and also having automatically operated means for alternately reversing the discharge of lubricant therefrom, a conduit leading from one of the discharge ports of said fitting and returning to the other, a plurality of feeders connected to said conduit through which lubricant is discharged into bearings associated therewith, and by-pass means in said feeders permitting flow of lubricant under pressure from said fitting and through said conduit and feeders and back to said fitting in either direction of flow, and a moveable member mounted on said fitting actuated by said flow-reversing means for indicating whether or not the conduit is broken.

43. The combination of a plurality of bearings to be lubricated, a series of measuring devices one adjacent each of said bearings, a pipe-line connecting said devices and extending from each end of the series, a lubricant fitting for receiving lubricant under pressure and connected to the extending extremities of the pipe-line, each of said devices supplying a measured quantity of lubricant to its associated bearing and uncovering a passage to the pipe-line leading to the next fitting when lubricant flows therethrough in either direction of flow, and automatically operated means for directing lubricant through said pipe-line and measuring devices in alternate directions of flow.

44. The combination of a plurality of bearings to be lubricated, a series of measuring devices one adjacent each of said bearings, a pipe-line connecting said devices and extending from each end of the series, a lubricant fitting for receiving lubricant under pressure and connected to the extending extremities of the pipe-line, each of said devices supplying a measured quantity of lubricant to its associated bearing and uncovering a passage to the pipe line leading to the next device of the series and back to the lubricant fitting when lubricant flows therethrough in either direction of flow, means for directing lubricant through said pipe-line and measuring devices in either direction of flow, and a moveable circuit indicating member operable by the pressure of lubricant on completion of a circuit through the pipe-line.

45. The combination of a plurality of bearings to be lubricated, a series of measuring devices one adjacent each of said bearings, a pipe-line connecting said devices and extending from each end of the series, a lubricant fitting for receiving lubricant under pressure and connected to the extending extremities of the pipe-line, each of said devices supplying a measured quantity of lubricant to its associated bearing and uncovering a passage to the pipe-line leading to the next device of the series and back to the lubricant fitting, indicating means responsive to the flow of lubricant through the fitting for indicating when the lubricant has made a complete circuit from the lubricant fitting and through the pipe-line and measuring devices and back to the lubricant fitting, and means for directing lubricant through said pipe-line and measuring devices in either direction of flow.

46. The combination with a pump, of a lubricant conduit extending therefrom and returning thereto and provided with a plurality of passageways adapted for connection to a plurality of bearings, indicating means including a member moveable in response to the return flow of lubricant under pressure for indicating when the lubricant has made a complete circuit through said conduit, hand operated means for reversing the flow through the conduit, means within the conduit for stopping the flow through the conduit when a bearing to which it leads is clogged, said means also supplying a quantity of lubricant to that bearing when it is not clogged and adapted to permit the lubricant to flow on through the conduit after such measured quantity has been supplied to that bearing.

47. A lubricant system comprising a single-pipe circuit having its respective ends connected to a flow-reversing member receiving lubricant under pressure, feeders arranged in series in said single-pipe circuit and forming part thereof, bearings connected to said feeders, said feeders having means for discharging a measured quantity of lubricant as a result of each operation, and a moveable indicator for showing when the lubricant has passed through the entire circuit.

48. A lubricating system for supplying lubricant to a plurality of bearings, comprising a reversible-flow single-pipe circuit, feeders arranged in series in said single-pipe circuit and connected to said bearings by relatively short branch pipes and receiving from said single-pipe circuit lubricant flowing under pressure first in one and then in the opposite direction, a flow-reversing member connected to the ends of said single-pipe circuit for receiving lubricant under pressure for distribution through the single-pipe circuit to the respective feeders and thence to bearings, said feeders embodying means whereby discharge of a measured quantity of lubricant to the connected bearings is insured upon each reversal of flow of the lubricant, a moveable telltale indicator controlled by the return flow of lubricant under pressure in said flow-reversing member and mounted thereon that shows whether or not all connected bearings have been lubricated, said flow-reversing member functioning normally in changing direction of flow when the last feeder of the piping circuit has been served.

49. The combination of a plurality of bearings to be lubricated and a single-pipe flow-reversing lubricating system comprising a single-pipe main lubricant-distributing circuit, means for supplying lubricant thereto under pressure, lubricant feeders arranged in series in said main circuit and forming part thereof, branch pipes connecting said feeders to the bearings to be lubricated, means within the feeders to insure discharge therefrom to the bearings connected therewith of a measured quantity of lubricant upon each reversal of the direction of flow of lubricant within said main circuit, and a flow-reversing and circuit indicating member connected to the means for supplying lubricant under pressure, the ends of said circuit being connected to the flow-reversing and circuit indicating member, said member having a part moveable in response to the return flow of lubricant thereto from said circuit under pressure for indicating the completion of a flow of lubricant through the circuit.

50. The combination of a plurality of bearings to be lubricated and a single-pipe flow-reversing lubricating system comprising a single-pipe main lubricant-distributing circuit, means for supplying lubricant thereto under pressure, means for reversing the direction of flow of lubricant in said circuit, said means being operable automatically upon return flow of lubricant thereto from the circuit, lubricant feeders arranged in series in said main circuit and forming part thereof, branch pipes connecting said feeders to the bearings to be lubricated, and means within the feeders to insure discharge therefrom to the bearings connected therewith of a measured quantity of lubricant upon each reversal of the direction of flow of lubricant within said main circuit, the ends of said circuit being connected to the means for reversing the direction of flow of lubricant in said circuit, said reversing means including means for indicating the completion of a flow of lubricant through the circuit.

51. In apparatus of the class described, a body having a pressure fluid inlet and a plurality of outlets and an exhaust, a primary valve means operable to alternately connect the inlet with the respective outlets, secondary valve means adapted to control said primary valve means by directing pressure thereto from said inlet and from the primary valve means to said exhaust, a conduit having the ends thereof connected to said outlets and through which pressure fluid is adapted to be returned to said body by being forced through the conduit alternately in opposite directions, means responsive to pressure fluid being returned to said body through said conduit for actuating said secondary valve, and valve means rendered effective by actuation of said primary valve means for controlling said pressure responsive means.

52. A fluid-distributing device comprising a body having an inlet port for receiving fluid under pressure and a pair of dual-service ports for discharging fluid to and for receiving fluid from a fluid-conveying circuit and automatically operated means for alternately directing lubricant from said device to the circuit first in one direction of flow and then in the other direction of flow.

53. A fluid-distributing device comprising a body having an inlet port for receiving fluid under pressure and a pair of dual-service ports for discharging fluid to and for receiving fluid from a fluid-conveying circuit, automatically operated means for alternately directing fluid from said device to the circuit first in one direction of flow and then in the other direction of flow, and means for indicating when fluid has been received from the circuit.

54. A fluid-distributing device comprising a body having an inlet port for receiving fluid under pressure and a pair of dual-service ports for discharging fluid to and for receiving fluid from a fluid-conveying circuit, automatically operated means for alternately directing fluid from said device to the circuit in one direction of flow and then in the other, and an indicator operated by said automatically operated alternating means for showing when lubricant discharged to the circuit has made a complete circuit therethrough.

55. A fluid-distributing device comprising a body having an inlet port for receiving fluid under pressure and a pair of dual-service ports for connection to a fluid-conveying circuit, a discharge port, passages connecting said ports, and automatically operated means for alternately directing fluid from said device to the circuit first out of one and then out of the other of said pair of ports.

56. A fluid-distributing device comprising a body having an inlet port for receiving fluid under pressure and a pair of ports for connection to a fluid-conveying circuit, a discharge port, passages connecting said ports, automatically operated means for alternately directing lubricant to the circuit first in one and then in the opposite direction of flow, and means for indicating when fluid has been received from the circuit.

57. A fluid-distributing device comprising a body having an inlet port for receiving fluid under pressure and a pair of ports for connection to a fluid-conveying circuit, a discharge port, passages connecting said ports, automatically operated means for alternately directing fluid to the circuit first in one and then in the opposite direction of flow, and an indicator operated by said automatically operated alternating means for showing when lubricant discharged out of one of the ports to the circuit has been received by the device through the other of said ports.

58. A fluid distributing device comprising a body having an inlet port and a pair of dual-service ports for discharging fluid to and for receiving fluid from a fluid-conveying circuit, a discharge port, passages interconnecting all of said ports, and automatically operated valve means for controlling said passages whereby connection is alternately established between the inlet port and each of said ports to the circuit, said means, upon each reversal thereof, simultaneously causing a discharge of fluid out of said discharge port.

59. A fluid-distributing device comprising a body having an inlet port and a pair of dual-service ports for discharging fluid to and for receiving fluid from a fluid-conveying circuit and a discharge port, passages interconnecting all of said ports, automatically operated valve means for controlling said passages whereby connection is alternately established between the inlet port and each of said ports to the circuit, said means, upon each reversal thereof, simultaneously causing a discharge of fluid out of said discharge port, and means for indicating when fluid has been receiver from the circuit.

60. A fluid-distributing device comprising a body having an inlet port and a pair of dual-service ports for discharging fluid to and for receiving fluid from a fluid-conveying circuit and a discharge port, passages interconnecting all of said ports, automatically operated valve means for controlling said passages whereby connection is alternately established between the inlet port and each of said ports to the circuit, said means, upon each reversal thereof, simultaneously causing a discharge of fluid out of said discharge port, and an indicator operated by said alternating means for showing when fluid discharged out of one of the ports to the circuit has been received by the device through the other of said ports.

61. A flow-reversing fluid-distributing device comprising a body member having an inlet port, a pair of dual-service ports for delivering fluid to and for receiving fluid from a circuit, a return discharge port, a valve chamber communicating with the inlet port through a passageway in the body member and communicating with each of the dual-service ports through independent passageways in the body member, a second valve chamber communicating with the inlet port through an independent passageway in the body member and communicating with each end of the first mentioned valve chamber through independent passageways in the body member, a third valve chamber communicating with the first mentioned valve chamber through two independent passageways in the body member, a cylinder and a piston reciprocable therein, each end of said cylinder communicating with the third mentioned valve chamber through suitable passageways in the body member, the body member having suitable outlet passages connecting each of said valve chambers to the discharge port, and valve means in each of said valve chambers controlled by the piston in the cylinder whereby fluid will be directed to the circuit first in one direction of flow and after re-entering the device, will then be directed in the opposite direction of flow.

62. A fluid-reversing and circuit-indicating fluid distributing device comprising a body member having an inlet port, a pair of dual-service ports for delivering fluid to and for receiving fluid from a circuit, a return discharge port, a valve chamber communicating with the inlet port through a passageway in the body member and with each of the dual-service ports through independent passageways in the body member, a second valve chamber communicating with the inlet port through an independent passageway in the body member and communicating with each end of the first mentioned valve chamber through independent passageways in the body member, a third valve chamber communicating with the first mentioned valve chamber through two independent passageways in the body member, a cylinder and a piston reciprocable therein, each end of said cylinder communicating with the third mentioned valve chamber through suitable passageways in the body member, the body member having suitable outlet passageways from each of said valve chambers to the return discharge port, fluid pressure operated valve means in each of said valve chambers controlled by the movement of the piston in the cylinder whereby fluid will be directed to the circuit first in one direction of flow and after re-entering the device will then be directed to the circuit in the other direction of flow, and means indicating when the flow is reversed.

63. In a fluid flow reversing device the combination of, a casing; apertures in said casing comprising an inlet port and two dual-service ports, fluid dispensing valve means movably disposed in said casing for selectively dispensing injected fluid from said inlet port out of either one of said dual-service ports into the end of an associated line, and means responsive to the return of dispensed fluid into the alternate one of said dual-service ports for shifting said movable valve means to dispense the fluid out of said alternate one of said duel-service ports.

64. In a fluid flow reversing device the combination of, a casing, apertures in said casing comprising an inlet port and two dual-service ports, fluid dispensing valve means movably disposed in said casing for selectively dispensing injected fluid from said inlet port out of either one of said dual-service ports into the end of an associated line, fluid pressure responsive actuator means for shifting said movable valve means to dispense the fluid out of said alternate one of said dual-service ports and means responsive to the return of dispensed fluid into the alternate one of said dual-service ports for controlling the application of fluid pressure to operate said fluid responsive actuator means.

65. In a fluid flow reversing device the combination of, a casing, apertures in said casing comprising an inlet port and two dual-service ports, fluid dispensing valve means movably disposed in said casing for selectively dispensing injected fluid from said inlet port out of either one of said dual-service ports into the end of an associated line, piston actuating means connected for shifting said movable dispensing valve means to dispense the fluid out of said alternate one of the dual-service ports, a control valve for controlling the admission of fluid pressure to either side of said actuating piston means and a control valve actuating piston responsive to the return of dispensed fluid from an associated line into the alternate one of said line ports for actuating said control valve.

66. In a fluid flow reversing device the combination of, a casing, apertures in said casing comprising an inlet port, two dual-service ports and an exhaust, fluid dispensing valve means movably disposed in said casing for selectively dispensing injected fluid from said inlet port out of either of said dual-service ports into the corresponding end of an associated circuit pipe line, actuator piston means connected for shifting said movable dispensing valve means to dispense the fluid out of said alternate one of the dual-service ports, a control valve for controlling the admission of fluid pressure to either side of said actuating piston means, a control valve actuating piston responsive to the return of dispensed fluid from the alternate end of the associated circuitous pipe line into the alternate one of said dual-service ports for actuating said control valve and valve means leading the returned fluid alternately to one side and then to the other of the control valve actuating piston and controlling the discharge of fluid out of the exhaust port.

67. In combination in a device adapted to reverse the flow of fluid throughout a circuit, a fluid dispensing valve, fluid pressure responsive actuator means for operating said dispensing valve, a control valve for applying fluid pressure to reversibly operate said actuator means and a fluid pressure responsive control valve actuator operable by pressure of fluid returning to said device after passing through the associated circuit.

68. A flow-reversing device comprising a body having an inlet port for receiving fluid under pressure and a pair of dual-service ports for discharging fluid to and for receiving fluid from a fluid conveying circuit and automatically operated means controlled by the flow of the fluid through the member for causing fluid entering said device through the inlet port first to be discharged from said device to the circuit through one of said dual-service ports in one direction of flow while the other dual-service port acts as a return port for fluid returning from the circuit and for then causing the fluid entering said device through the inlet port to be discharged from said device to the circuit in the other direction of flow through the dual-service port which last acted as a return port while the returning fluid reenters said device through the dual-service port that first acted as a discharge port to the circuit.

69. In apparatus of the class described, a body having a pressure inlet and a plurality of outlets and an exhaust, a primary valve means adapted to alternately connect the inlet with the respective outlets, secondary valve means adapted to control said primary valve means by directing pressure thereto from said inlet and from the primary valve means to said exhaust, and connecting means between said outlets and the secondary valve means including valve elements of the primary valve means, said secondary valve means including means operable in response to pressure transmitted through the connecting means.

70. In a fluid flow reversing device the combination of, a casing, apertures in said casing comprising an inlet port and two line ports, fluid dispensing valve means movably disposed in said casing for selectively dispensing injected fluid from said inlet port out of one of said line ports into the end of an associated line, an actuating piston connected for shifting said movable dispensing valve means to dispense the fluid out of the other of the line ports, a control valve for controlling the admission of fluid pressure to the opposite ends of said actuating piston and a control valve actuating piston responsive to the return of dispensed fluid from an associated line into said other one of said line ports for actuating said control valve.

71. In combination in a fluid flow reversing device, casing means, a fluid dispensing valve, a guiding aperture in said casing means for slidably receiving said fluid dispensing valve, port recesses opening into said guiding aperture comprising an inlet port and two line ports for connection with the ends of a fluid distributing line, an actuating piston connected to said dispensing valve, a guiding aperture in said casing means for slidably receiving said actuating piston, a control valve for applying fluid pressure to said actuating piston for reversely operating said fluid dispensing valve, a control valve actuating piston connected to said control valve, means controlled by said fluid dispensing valve for applying fluid returned from an associated line for reversibly operating said control valve actuating piston, and driving means interconnecting said control valve and the control valve actuating piston for actuation when fluid pressure returns from an associated line into either one of said line ports.

DAVID R. HILLIS.